US008910465B2

(12) United States Patent
Snyder

(10) Patent No.: US 8,910,465 B2
(45) Date of Patent: Dec. 16, 2014

(54) GAS TURBINE ENGINE AND HEAT EXCHANGE SYSTEM

(75) Inventor: Douglas J. Snyder, Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 733 days.

(21) Appl. No.: 12/979,028

(22) Filed: Dec. 27, 2010

(65) Prior Publication Data

US 2012/0144842 A1 Jun. 14, 2012

Related U.S. Application Data

(60) Provisional application No. 61/291,631, filed on Dec. 31, 2009.

(51) Int. Cl.

*F02C 7/14* (2006.01)
*F02C 7/18* (2006.01)
*F02C 7/12* (2006.01)
*F02K 3/06* (2006.01)
*F01D 25/12* (2006.01)

(52) U.S. Cl.

CPC ... *F02C 7/14* (2013.01); *F02K 3/06* (2013.01); *F02C 7/18* (2013.01); *Y02T 50/676* (2013.01); *F05D 2260/20* (2013.01); *F02C 7/12* (2013.01); *F01D 25/12* (2013.01)
USPC .................................. 60/266; 60/782; 60/785

(58) Field of Classification Search

CPC .............. F01D 25/12; F02C 7/12; F02C 7/14; F02C 7/18; F02K 3/06; F05D 2260/20; Y02T 50/676
USPC ............. 60/39.23, 226.1, 266, 728, 730, 762, 60/782, 785
See application file for complete search history.

(56) References Cited

U.S. PATENT DOCUMENTS 3,486,340 A * 12/1969 Du Pont et al. ................. 60/262
3,688,504 A 9/1972 Hutchinson et al.
4,254,618 A * 3/1981 Elovic .......................... 60/226.1
4,474,001 A * 10/1984 Griffin et al. ................... 60/204

(Continued)

FOREIGN PATENT DOCUMENTS

EP 0 469 825 2/1992
EP 1 795 708 6/2007

(Continued)

OTHER PUBLICATIONS

International Search Report and Written Opinion, PCT/US2010/062506, Rolls-Royce North American Technologies, Inc., Nov. 21, 2011.

(Continued)

*Primary Examiner* — William H Rodriguez
*Assistant Examiner* — Carlos A Rivera
(74) *Attorney, Agent, or Firm* — Krieg DeVault LLP

(57) ABSTRACT

One embodiment of the present invention is a unique gas turbine engine. Another embodiment is a unique gas turbine engine heat exchange system. Other embodiments include apparatuses, systems, devices, hardware, methods, and combinations for gas turbine engines and heat exchange systems for gas turbine engines. Further embodiments, forms, features, aspects, benefits, and advantages of the present application shall become apparent from the description and figures provided herewith.

19 Claims, 7 Drawing Sheets

(56) References Cited

U.S. PATENT DOCUMENTS

| | | | | |
|---|---|---|---|---|
| 5,012,646 | A | 5/1991 | Speer | |
| 5,123,242 | A * | 6/1992 | Miller | 60/226.1 |
| 5,165,253 | A | 11/1992 | Kamegasawa et al. | |
| 5,729,969 | A * | 3/1998 | Porte | 60/226.1 |
| 5,782,076 | A * | 7/1998 | Huber et al. | 60/782 |
| 5,915,469 | A | 6/1999 | Abramzon et al. | |
| 6,058,696 | A | 5/2000 | Nikkanen et al. | |
| 6,134,880 | A * | 10/2000 | Yoshinaka | 60/226.1 |
| 6,250,061 | B1 * | 6/2001 | Orlando | 60/772 |
| 6,302,191 | B1 | 10/2001 | Wickham et al. | |
| 6,931,834 | B2 * | 8/2005 | Jones | 60/226.1 |
| 6,942,183 | B2 | 9/2005 | Zywiak | |
| 7,000,404 | B2 | 2/2006 | Palmisano et al. | |
| 8,695,324 | B2 * | 4/2014 | Giffin et al. | 60/226.1 |
| 8,756,910 | B2 * | 6/2014 | Donovan et al. | 60/266 |
| 2003/0061818 | A1 | 4/2003 | Nash et al. | |
| 2005/0268612 | A1 | 12/2005 | Rolt | |
| 2006/0115356 | A1 | 6/2006 | Balsdon | |
| 2007/0235080 | A1 | 10/2007 | Hocking | |
| 2007/0245738 | A1 * | 10/2007 | Stretton et al. | 60/728 |
| 2007/0264133 | A1 | 11/2007 | Schwarz et al. | |
| 2008/0006022 | A1 | 1/2008 | Schwarz et al. | |
| 2008/0230651 | A1 | 9/2008 | Porte | |
| 2009/0169359 | A1 | 7/2009 | Murphy et al. | |
| 2011/0120082 | A1 * | 5/2011 | Giffin et al. | 60/226.3 |
| 2011/0120083 | A1 * | 5/2011 | Giffin et al. | 60/226.3 |
| 2011/0167784 | A1 * | 7/2011 | Johnson et al. | 60/204 |
| 2011/0167791 | A1 * | 7/2011 | Johnson et al. | 60/226.3 |
| 2011/0167792 | A1 * | 7/2011 | Johnson et al. | 60/226.3 |

FOREIGN PATENT DOCUMENTS

| | | |
|---|---|---|
| EP | 1 898 069 | 3/2008 |
| EP | 2 009 260 | 12/2008 |
| FR | 2 891 313 | 3/2007 |

OTHER PUBLICATIONS

Extended European Search Report, EP 10851168.4, Rolls-Royce North American Technologies, Inc., Aug. 26, 2014.

* cited by examiner

GAS TURBINE ENGINE AND HEAT EXCHANGE SYSTEM

CROSS REFERENCE TO RELATED APPLICATIONS

The present application claims the benefit of U.S. Provisional Patent Application 61/291,631, filed Dec. 31, 2009, and is incorporated herein by reference.

GOVERNMENT RIGHTS

The present application was made with United States government support under Contract No. FA-8650-07-C-2803 awarded by the United States Air Force. The United States government may have certain rights in the present application.

FIELD OF THE INVENTION

The present invention relates to gas turbine engines, and more particularly, to heat exchange systems for gas turbine engines.

BACKGROUND

Gas turbine engines and heat exchange systems for gas turbine engines remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment is a unique gas turbine engine heat exchange system. Other embodiments include apparatuses, systems, devices, hardware, methods, and combinations for gas turbine engines and heat exchange systems for gas turbine engines. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
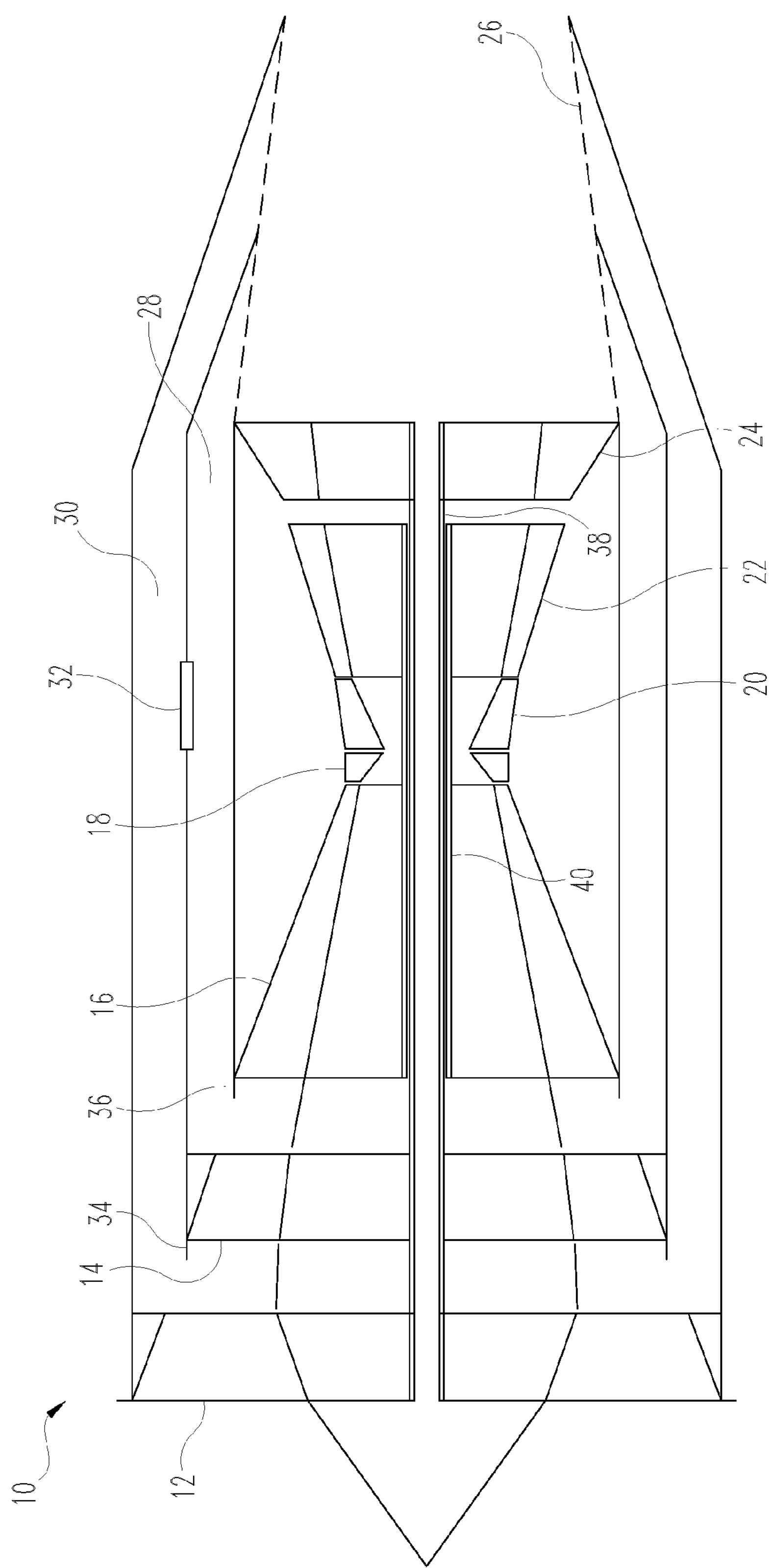
FIG. 1 schematically illustrates a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment (s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular FIG. 1, a non-limiting example of a gas turbine engine 10 in accordance with an embodiment of the present invention is schematically depicted. Gas turbine engine 10 is an aircraft propulsion power plant in the form of a turbofan engine. Gas turbine engine 10 includes a fan 12, a fan 14, a compressor system 16, a diffuser 18, a combustor 20, a turbine system with a high pressure (HP) turbine 22 and a low pressure (LP) turbine 24, an exhaust nozzle system 26, a bypass duct 28, a bypass duct 30, and an adaptive heat exchange system 32.

Each of fan 12 and fan 14 include a plurality of fan blades that pressurize air received at the fan inlet. In one form, fan 12 includes a single stage of circumferentially spaced blades and a single stage of circumferentially spaced vanes. In other forms, fan 12 may not include vanes, or may include multiple stages of both blades and vanes. Likewise, in one form, fan 14 includes a single stage of circumferentially spaced blades and a single stage of circumferentially spaced vanes. In other forms, fan 14 may not include vanes, or may include multiple stages of both blades and vanes. In one form, gas turbine engine 10 includes a flow control system 34 to direct some of the pressurized air discharged from fan 12 into fan 14 and some of the pressurized air into bypass duct 30. In some embodiments, flow control system 34 is configured to vary the amount of flow as between fan 14 and bypass duct 30. In some embodiments, flow control system 34 may be an active means of directing flow, e.g., controlled by a control system (not shown). In other embodiments, flow control system 34 may be passive, e.g., controlled based on pressures and/or temperatures in one or more regions of engine 10, or may be fixed. In still other embodiments, gas turbine engine 10 may not include a flow control system such as flow control system 34.

Compressor system 16 includes a plurality of blades and vanes for compressing air. In one form, compressor system 16 is a single compressor having a plurality of stages of blades and vanes driven by a common shaft at a common speed. In other embodiments, compressor system 16 may include a plurality of compressors operating at the same or different speeds, each of which includes one or more stages of blades, and each of which may also include a desirable number of vane stages. For example, in some forms, compressor system 16 may include an LP compressor and/or an intermediate pressure (IP) compressor and/or an HP compressor. In one form, gas turbine engine 10 includes a flow control system 36 to direct some of the pressurized air discharged from fan 14 into compressor system 16 and some of the pressurized air into bypass duct 28. In some embodiments, flow control system 36 is configured to vary the amount of flow as between compressor system 16 and bypass duct 28. In some embodiments, flow control system 36 may be an active means of directing flow, e.g., controlled by a control system (not shown). In other embodiments, flow control system 36 may be passive, e.g., controlled by pressures and/or temperatures in one or more regions of engine 10, or may be fixed. In still other embodiments, gas turbine engine 10 may not include a flow control system such as flow control system 36.

Diffuser 18 and combustor 20 are fluidly disposed between compressor system 16 and HP turbine 22. Compressor system 16, diffuser 18, combustor 20, HP turbine 22 and LP turbine 24 form an engine core. HP turbine 22 and LP turbine 24 extract power from the airflow exiting combustor 20. LP turbine 24 is drivingly coupled to fan 12 via an LP shaft 38. HP turbine 22 is drivingly coupled to compressor system 16 via an HP shaft 40. Compressor system 16, HP shaft 40 and HP turbine 22 form, in part, an HP spool. Fan 12, LP shaft 38 and LP turbine 24 form, in part, an LP spool. In one form, fan 14 is driven by LP turbine 24, which may be a direct coupling via LP shaft 38 in some embodiments. In other embodiments, fan 14 may be coupled to LP turbine 24 via a system that allows fan 14 to operate at a different speed than LP turbine 24, e.g., a fixed speed ratio or a variable ratio gear train. In still other embodiments, fan 14 may be powered by HP turbine 22.

During the operation of gas turbine engine 10, air is drawn into the inlet of fan 12 and pressurized by fan 12. Some of the air pressurized by fan 12 is directed into fan 14 by flow control system 34, and the balance is directed into bypass duct 30. Bypass duct 30 channels the pressurized air to exhaust nozzle system 26, which provides a component of the thrust output by gas turbine engine 10. The air directed into fan 14 is further pressurized by fan 14. Some of the air pressurized by fan 14 is directed into compressor system 16 by flow control system 36, and the balance is directed into bypass duct 28. Bypass duct 28 channels the pressurized air to exhaust nozzle system 26, which provides a component of the thrust output by gas turbine engine 10. Exhaust nozzle system 26 is operative to control the pressure of the air streams in exhaust nozzle system 26, including balancing pressures as between bypass duct 28 and bypass duct 30. In one form, bypass duct 28 is an annular duct that surrounds the core of engine 10, and bypass duct 30 is an annular duct that surrounds bypass duct 28. In other embodiments, bypass ducts 28 and 30 may have other geometric configurations suited to the particular application of engine 10.

Compressor system 16 receives the pressurized air from fan 14, which is compressed and discharged in to diffuser 18. Diffuser 18 diffuses the core flow that is discharged from compressor system 16, reducing its velocity and increasing its static pressure. The diffused airflow is directed into combustor 20. Fuel is mixed with the air in combustor 20, which is then combusted in a combustion liner (not shown). The hot gases exiting combustor 20 are directed into HP turbine 22, which extracts energy from the hot gases in the form of mechanical shaft power to drive compressor system 16 via HP shaft 40. The hot gases exiting HP turbine 22 are directed into LP turbine 24, which extracts energy in the form of mechanical shaft power to drive fan 12 and fan 14 via LP shaft 38. The hot gases exiting LP turbine 24 are directed into nozzle 26, and provide a component of the thrust output by gas turbine engine 10.

The airflow that passes through compressor system 16 and subsequently into combustor 20 is referred to herein as core flow (first stream flow). The pressurized airflow exiting fan 14 and received into bypass duct 28 is referred to herein as a second stream flow; and the pressurized airflow exiting fan 14 and received into bypass duct 30 is referred to herein as a third stream flow. Each of the core flow, second stream flow and third stream flow are working fluid streams. Working fluid in the context of the present application is the air that is directly employed in producing the primary output of engine 10. Working fluid includes the air that is compressed in compressor system 16 and expanded in turbines 22 and 24, the air that is pressurized in fan 12 and fan 14, but does not include secondary flows, such as cooling air flows, pressure balance air and the like. Bypass duct 28, bypass duct 30 and the flowpath extending through the engine core from fan 12 to turbine 24 are main flowpaths of the working fluid, as opposed to secondary passages for cooling air, pressure balance air and the like.

Adaptive heat exchange system 32 is operative to transfer heat from an object of cooling, and to adapt to different cooling medium source conditions. An object of cooling, as used herein, is a fluid, whether in liquid or gas form, and/or one or more components and/or systems that are sought to be cooled. In one form, the object of cooling is air. In a particular form, the object of cooling is air that has been compressed by compressor system 16. In other embodiments, the object of cooling may be one or more of hydraulic fluid and/or related systems/components, electrical and/or electronic circuits and/or systems, mechanical components and/or systems, and/or other components and/or systems, such as refrigeration components and/or systems.

In one form, heat exchange system 32 is operative to transfer heat from the object of cooling using one or more cooling stream sources. Embodiments of adaptive heat exchange system 32 may employ one or more of core flow, second stream flow and third stream flow as cooling medium sources. In other embodiments, heat exchange system 32 is operative to transfer heat from an object of cooling using air from two airways, such as using air as a cooling fluid medium obtained from two of: the core flow, the second stream flow, the third stream flow and an engine ambient environment.

In one form, heat exchange system 32 is in fluid communication with compressor system 16. In such embodiments, heat exchange system 32 is operative to receive pressurized air from compressor system 16, and extract heat therefrom to reduce the temperature of the received pressurized air. In one form, the airflow that is received by heat exchange system 32 for the removal of heat is a small portion of the core airflow, and is returned to the engine 10 core for use as cooling air in cooling turbine blades and vanes of HP turbine 22. In another form, the core air that is received by heat exchange system 32 for the removal of heat represents a larger amount of air, e.g., up to all of the core airflow in some embodiments, and is returned to compressor system 16 for additional compression. For example, in such embodiments, heat exchange system 32 may serve as an intercooler system. In still other embodiments, heat exchange system 32 may be employed to reduce the temperature of other objects of cooling.

Figure 2:
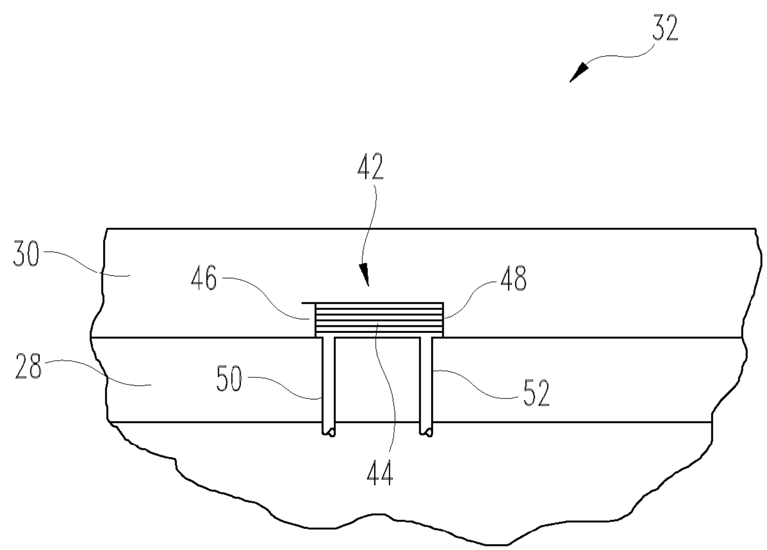
FIG. 2 depicts an adaptive heat exchange system in accordance with an embodiment of the present invention.
Figure 3:
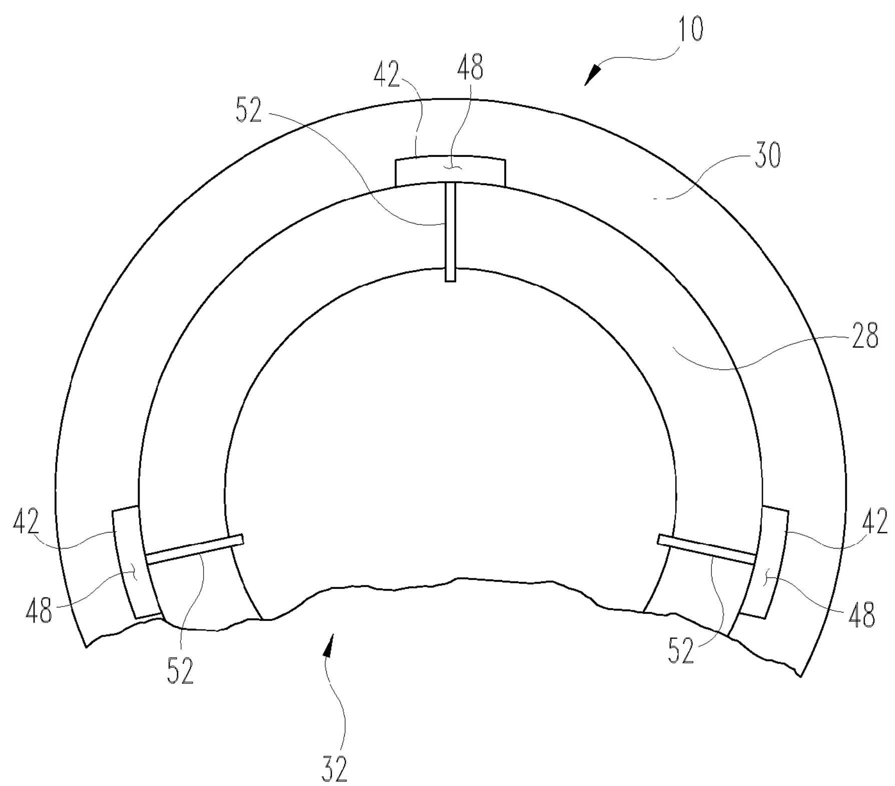
FIG. 3 schematically depicts an end view of the heat exchange system of FIG. 2.

Referring now to FIG. 2, some aspects of heat exchange system 32 are schematically depicted. Heat exchange system 32 includes a heat exchanger 42 having a heat exchanger core 44, a cooling medium inlet 46 for heat exchanger 42, and a cooling medium outlet 48 for heat exchanger 42. Some embodiments include one or more additional cooling medium inlets and cooling medium outlets. In one form, heat exchanger 42 is located between bypass duct 28 and bypass duct 30, although other locations are contemplated herein. In embodiments described herein, heat exchanger 42 is located in bypass duct 28 and/or bypass duct 30.

Heat exchanger 42 structured to remove heat from the object of cooling. In one form, heat exchanger 42 is operative to cool air received from compressor 16, in which case heat exchange system 32 includes a plurality of passages 50, 52. Passages 50, 52 are structured to conduct the object of cooling to and from heat exchanger core 44. In one form, passages 50, 52 include pipes that deliver core airflow to and from heat exchanger core 44. In other embodiments, other types of passages may be employed in addition to and/or in place of pipes. In other forms, heat exchange system 32 may not include passages 50, 52, e.g., where the object of cooling is an electronic component. In one form, heat exchanger 42 is a parallel flow heat exchanger. In other embodiments, other heat exchanger types may be employed, e.g., counter flow heat exchangers, cross flow heat exchangers and/or mixed flow heat exchangers.

The flow conditions in bypass duct 28 and bypass duct 30 may vary significantly during the operation of engine 10. For example, a high efficiency mode (specific fuel consumption (SFC) mode) of operation may result in different pressures and flow rates than a high thrust mode of operation. In one example, the pressure and flow rate in duct 30 in SFC mode is larger than the pressure and flow rate in high thrust mode. In high thrust mode, the pressure and flow rate in duct 28 are significantly higher than in duct 30. The pressure differential as between duct 28 and duct 30 and the flow rates in ducts 28 and 30 thus vary with engine output and mode of operation. In one form, heat exchange system 32 is adapted to obtain the cooling medium from one or both of duct 28 and duct 30. The adaptive performance of heat exchange system 32 may be passively controlled or actively controlled. Embodiments that are passively controlled vary the cooling medium input source passively, e.g., based on pressures, without a control system input. Embodiments that are actively controlled vary the cooling medium input source actively, based on control inputs.

Figure 4A:
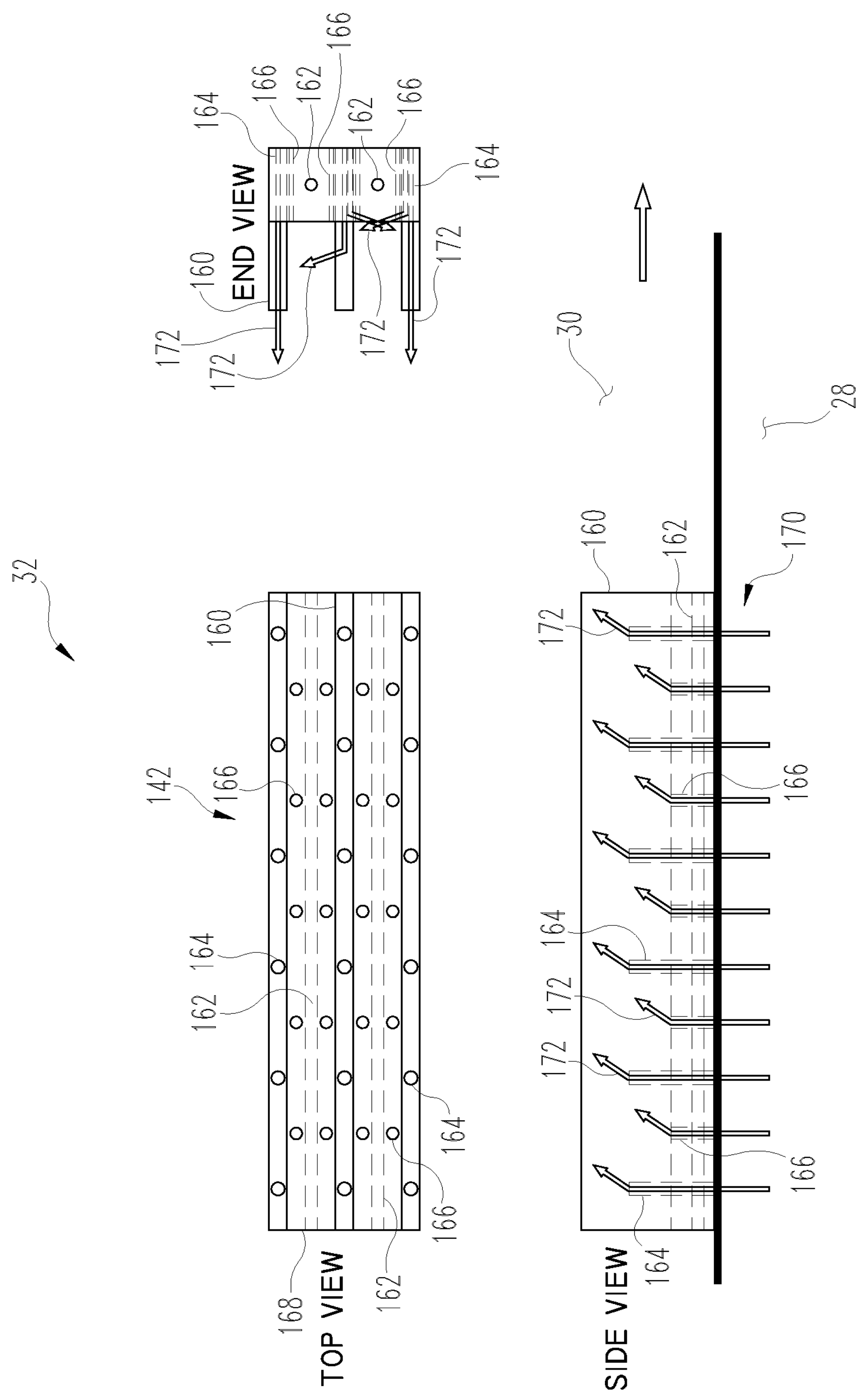
FIGS. 4A and 4B schematically illustrate an adaptive heat exchange system in accordance with an embodiment of the present invention.
Figure 4B:
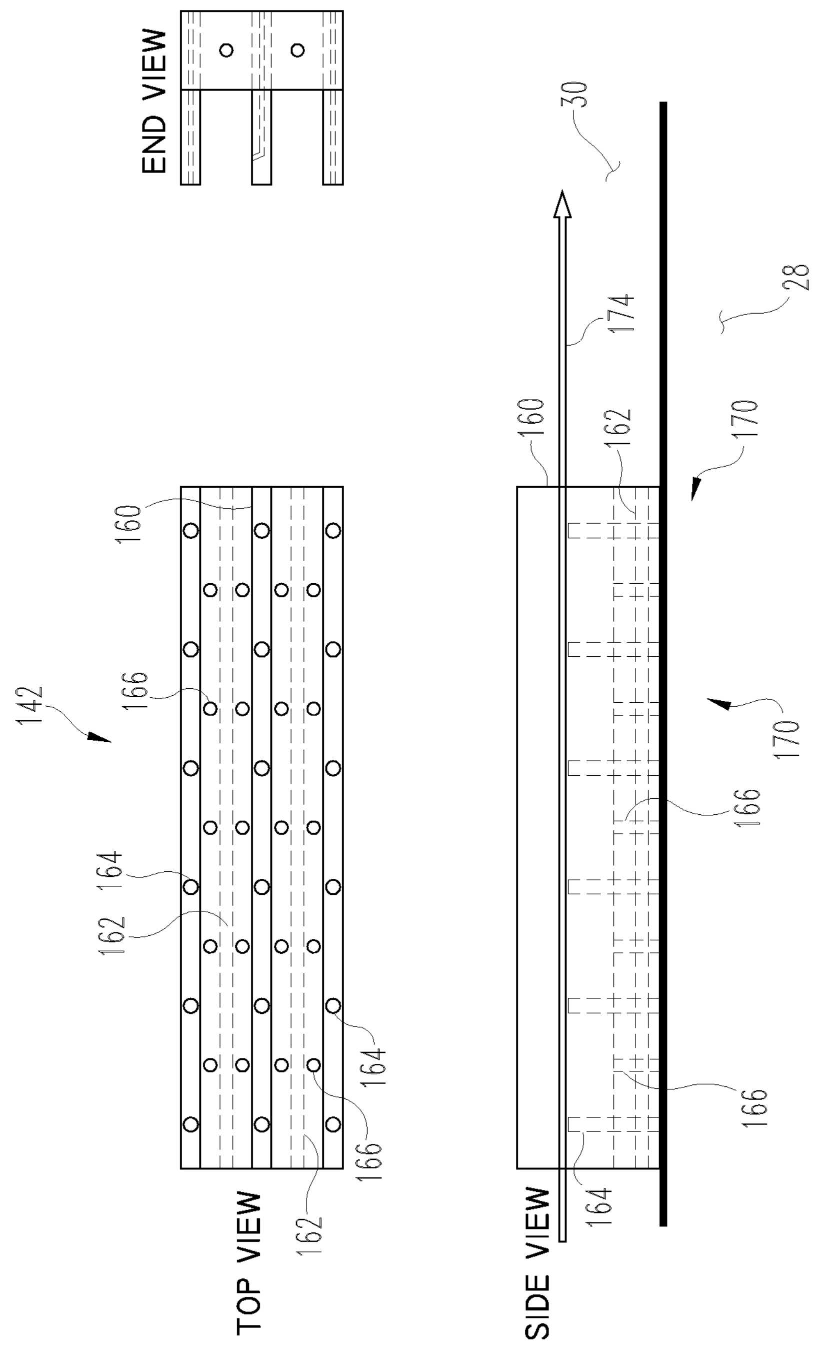

Referring now to FIGS. 4A and 4B, a non-limiting example of aspects of heat exchange system 32 in accordance with an embodiment of the present invention is schematically depicted. In the embodiment of FIGS. 4A and 4B, heat exchange system 32 includes a heat exchanger 142 depicted in top, side and end views. In one form, heat exchanger 142 is similar to heat exchanger 42. Heat exchanger 142 includes a plurality of fins 160, passages 162 for flowing the object of cooling (which in the present example is air from compressor system 16), and passages 164 and 166. Fins 160 are exposed to third stream air from bypass duct 30 via a cooling medium inlet 168 to provide air as a cooling medium to extract heat from the object of cooling. Passages 164 and 166 are exposed to second stream air from bypass duct 28, and function as an inlet 170 to heat exchanger 142 that supplies air 172 as a cooling medium to fins 160 and through heat exchanger 142. In one form, passages 164 extend through fins 160. In one form, passages 164 direct the cooling medium to impinge upon adjacent fins 160. In one form, passages 166 direct the cooling medium to impinge upon fins 160. In some embodiments, only one type of passage geometry, such as that illustrated for passages 164 or passages 166 may be employed, with or without impingement cooling. In other embodiments more cooling passage geometries in addition to and/or in place those illustrated for passages 164 and 166 may be employed. In the depiction of FIGS. 4A and 4B, air 172 and air 174 are both discharged via the outlet of heat exchanger 142 into duct 30. In one form, passages 164 and 166 are perpendicular to passages 162, which provides cross-flow heat exchange. In one form, air 174 flows along the length of fins 160, which in one form are parallel to passages 162, and which provides parallel flow heat exchange. In other embodiments, other orientations may be employed.

In the depiction of FIG. 4A, engine 10 is operating in high thrust mode, wherein the pressure in duct 28 is greater than the pressure in duct 30. Accordingly, the cooling is primarily provided by air 172 from the second stream flow supplied by duct 28 via passages 164 and 166. In the depiction of FIG. 4B, engine 10 is operating in SFC mode, wherein the pressure in duct 28 is approximately similar to that the pressure in duct 30. Accordingly, the cooling is primarily provided by air 174 from the third stream flow in duct 30 that moves past fins 160. The embodiment of FIGS. 4A and 4B is a passively controlled system, since no control inputs or valves are used to direct the flow through inlets 168 and 170.

Figure 5A:
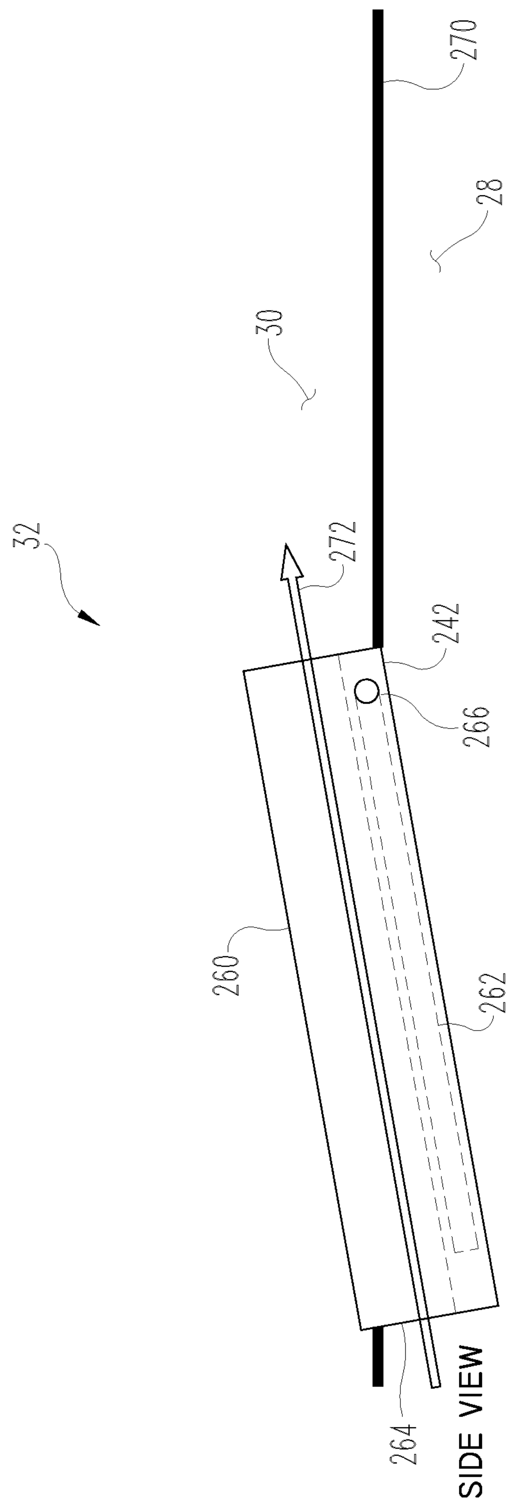
FIGS. 5A and 5B schematically illustrate an adaptive heat exchange system in accordance with an embodiment of the present invention.
Figure 5B:
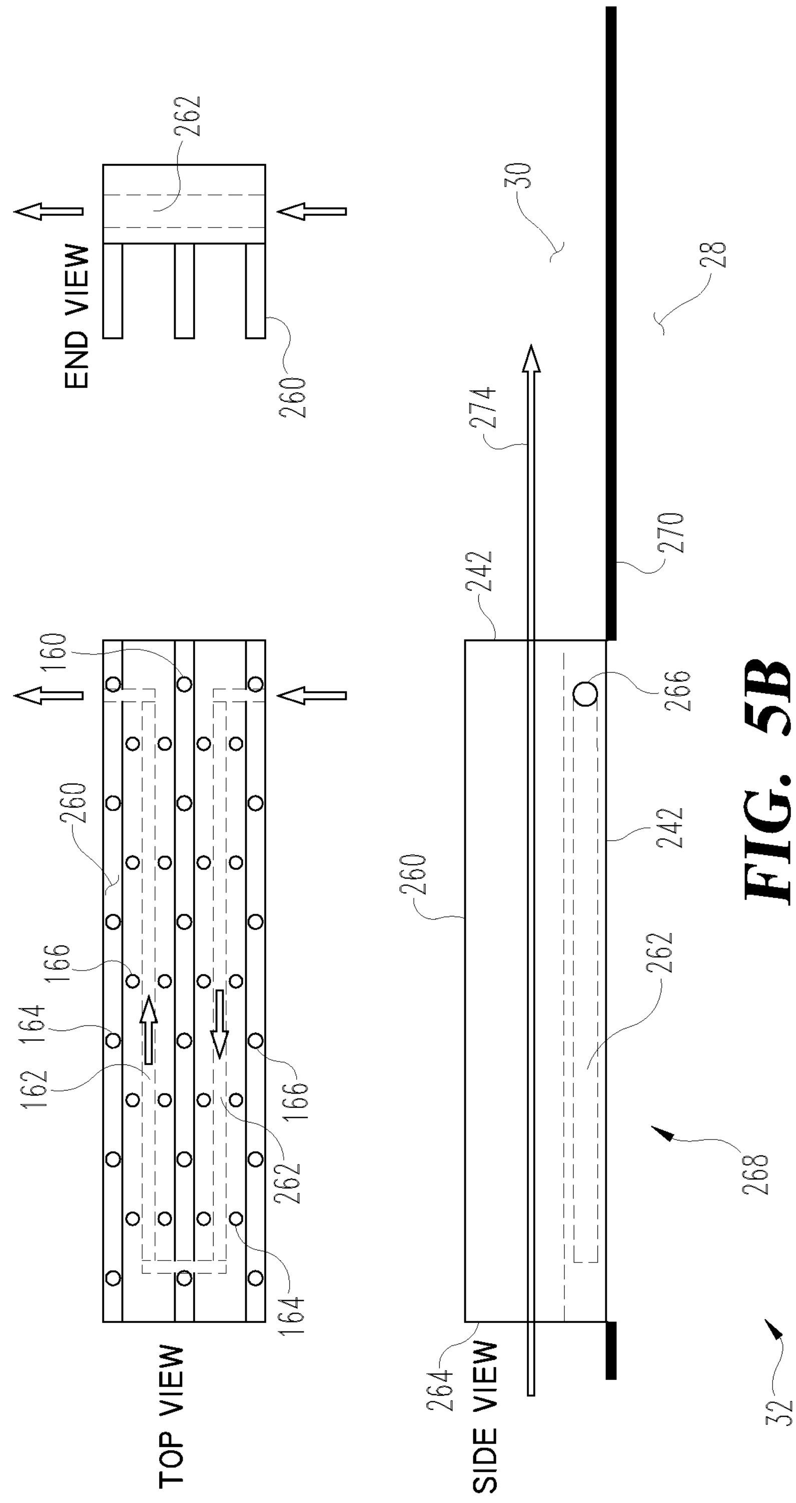

Referring now to FIGS. 5A and 5B, a non-limiting example of aspects of heat exchange system 32 in accordance with an embodiment of the present invention is schematically depicted. In the embodiment of FIGS. 5A and 5B, heat exchange system 32 includes a heat exchanger 242 depicted in top, side and end views. In one form, heat exchanger 242 is similar to heat exchanger 42. Heat exchanger 242 includes a plurality of fins 260, passages 262 for flowing the object of cooling (which in the present example is air from compressor system 16), and a cooling medium inlet 264 for admitting cooling air past fins 260. Passages 262 are supplied with the object of cooling via ducting that includes hinges 266. Heat exchanger 242 is disposed in duct 30 adjacent an opening 268 in a wall 270 separating bypass duct 30 from bypass duct 28. Hinges 266 allow heat exchanger 242 to pivot under the action of a mechanism (not shown) so that inlet 264 may be selectively exposed to bypass duct 28 or bypass duct 30 or both.

In the depiction of FIG. 5A, engine 10 is operating in high thrust mode, wherein the pressure in duct 28 is greater than the pressure in duct 30. Accordingly, heat exchanger is pivoted inward, and the cooling is primarily provided by air 272 from the second stream flow, which is supplied by duct 28 via cooling medium inlet 264. In the depiction of FIG. 5B, engine 10 is operating in SFC mode, wherein the pressure in duct 28 is approximately similar to that the pressure in duct 30, but the flow rate is greater in duct 30. Accordingly, the cooling is primarily provided by air 274 from the third stream flow in duct 30, which is admitted to fins 160 via cooling medium inlet 264. The embodiment of FIGS. 5A and 5B is an actively controlled system, whereby control inputs, e.g., based on pressure and/or flow data in ducts 28 and 30 or other control parameters, are used to activate the mechanism to pivot heat exchanger 242 about hinges 266. In other embodiments, a passive system may be employed to pivot heat exchanger 242, e.g., based on the pressures in ducts 28 and 30. In the depiction of FIGS. 5A and 5B, air 272 and air 274 are both discharged via the outlet of heat exchanger 242 into duct 30.

Figure 6A:
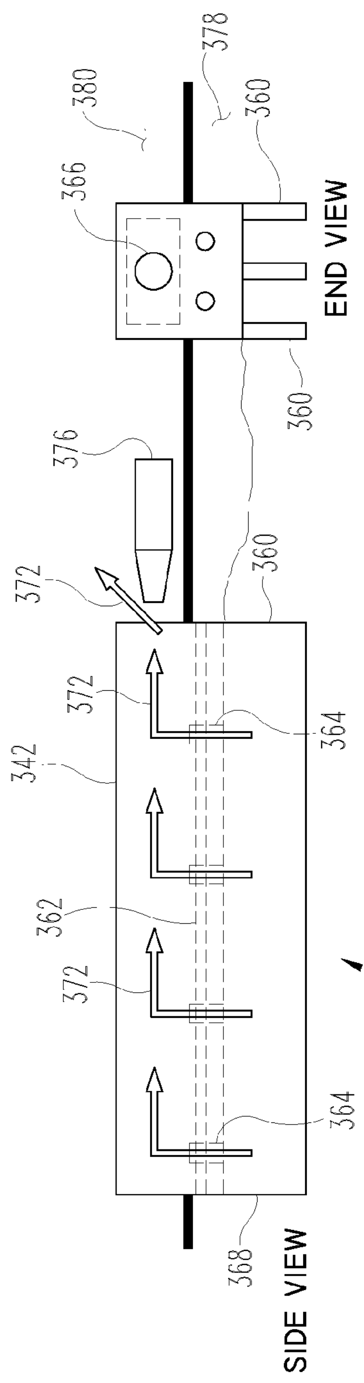
FIGS. 6A and 6B schematically illustrate an adaptive heat exchange system in accordance with an embodiment of the present invention.
Figure 6B:
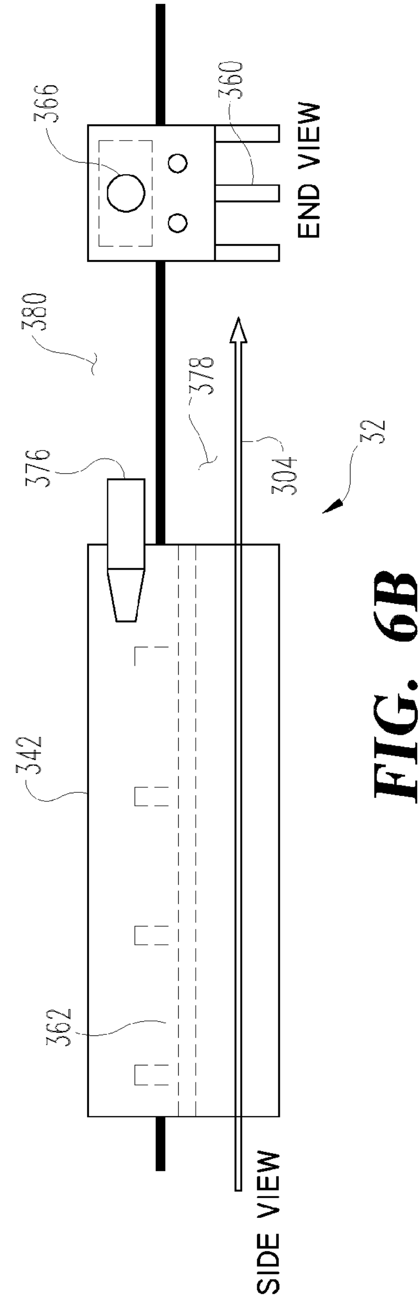

Referring now to FIGS. 6A and 6B, a non-limiting example of aspects of heat exchange system 32 in accordance with an embodiment of the present invention is schematically depicted. In the embodiment of FIGS. 6A and 6B, heat exchange system 32 includes a heat exchanger 342 depicted in side and end views. In one form, heat exchanger 342 is similar to heat exchanger 42. Heat exchanger 342 includes a plurality of fins 360, passages 362 for flowing the object of cooling (which in the present example is air from compressor system 16), and passages 364 and 366. Fins 360 are exposed to air from a bypass duct 378 via a cooling medium inlet 368 to extract heat from the object of cooling. Passages 364 and 366 are also exposed to air from bypass duct 378. Duct 378 may be any fan bypass duct of a gas turbine engine.

In the embodiment of FIGS. 6A and 6B, an engine ambient environment 380, such as an engine nacelle or an airstream surrounding bypass duct 378, forms a pressure sink to receive cooling air discharged from duct 378. Passages 364 function as an inlet 370 to heat exchanger 342 that supplies air 372 to flow past fins 360 and into and out of heat exchanger 342. Fins 360 are located in duct 28 in the embodiment of FIGS. 6A and 6B. In other embodiments, fins 360 may be partially or completely disposed in environment 380. A plug 376 is controllably employed via a mechanism (not shown) to selectively block or unblock the exit of passage 366 to prevent or allow flow through passage 366, hence passages 364 and inlet 370. In other embodiments, other types of valving mechanisms may be employed to turn on or off the flow of cooling medium through heat exchanger 342, or to modulate the same.

In the depiction of FIGS. 6A and 6B, heat exchanger 342 is controlled to selectively choose between providing cooling using air 304 in duct 378 alone or in conjunction with air 372 bled from duct 378 that is passed through passages 364 and 366 as cooling air 372 to provide additional cooling capacity. In the depiction of FIGS. 6A and 6B, air 304 is discharged through an outlet of heat exchanger 342 into duct 378, and air 372 is discharged via an outlet of heat exchanger 342 into environment 380.

Embodiments of the present invention include a gas turbine engine, comprising: an engine core; a fan bypass duct operative to direct a bypass stream around the engine core; an other fan bypass duct operative to direct an other bypass stream around the engine core; and an adaptive heat exchange system operative to cool an object of cooling using air from the fan bypass duct and the other fan bypass duct as a cooling medium.

In a refinement, the heat exchange system includes a heat exchanger having a cooling medium inlet and a cooling medium outlet; the cooling medium inlet is selectively exposed to a selected one or both of the fan bypass duct and the other fan bypass duct to receive a cooling medium; and the cooling medium outlet is positioned to discharge the cooling medium into the other bypass duct.

In another refinement, the heat exchanger is hinged to selectively expose the cooling medium inlet to the selected one or both of the fan bypass duct and the other fan bypass duct.

In yet another refinement, the adaptive heat exchange system includes a heat exchanger operative to exchange heat in a parallel flow mode and a cross flow mode.

In still another refinement, the heat exchanger includes a fin operative to transfer heat from the object of cooling; the parallel flow mode directs the cooling medium in a first direction parallel to the fin; and the cross flow mode directs the cooling medium in a second direction not parallel to the fin.

In yet still another refinement, the heat exchanger includes a first cooling medium inlet for receiving the cooling medium in the parallel flow mode; and the heat exchanger includes a second cooling medium inlet for receiving the cooling medium in the cross flow mode.

In a further refinement, the second cooling medium inlet includes an opening operative to impinge the cooling medium onto the fin.

In yet a further refinement, the adaptive heat exchange system is operative to cool the object of cooling using air by selecting the air from one or both of the fan bypass duct and the other fan bypass duct in response to an engine operating condition.

In a still further refinement, the adaptive heat exchange system is passively controlled.

In a yet still further refinement, the adaptive heat exchange system is actively controlled.

Embodiments of the present invention include a gas turbine engine, comprising: a first airway; a second airway; and an adaptive heat exchange system operative to cool an object of cooling using air from the first airway and the second airway as a cooling medium.

In a refinement, the first airway is a first working fluid main flowpath; and the second airway is a second working fluid main flowpath.

In another refinement, the adaptive heat exchange system includes a heat exchanger having a first cooling medium inlet and a second cooling medium inlet; the first cooling medium inlet is adapted to receive the cooling medium from one of the first airway and the second airway; and the second cooling medium inlet is adapted to receive the cooling medium from the other of the first airway and the second airway.

In yet another refinement, the heat exchanger employs impingement cooling.

In still another refinement, the adaptive heat exchange system includes a valve operative to control flow through one of the first cooling medium inlet and the second cooling medium inlet.

In yet still another refinement, the adaptive heat exchange system includes a cooling medium exit; and wherein the valve is positioned in the cooling medium exit.

Embodiments of the present invention include a gas turbine engine, comprising: a compressor; a combustor in fluid communication with the compressor; a turbine in fluid communication with the combustor; and an adaptive heat exchange system having means for cooling air from the compressor prior to being discharged into the turbine.

In a refinement, the air is discharged into the turbine as cooling air.

In another refinement, the means for cooling air includes means for receiving a cooling medium from more than one cooling medium source.

In still another refinement, the means for receiving is actively controlled to select a cooling medium source.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:

an engine core;

a first fan operable to generate a first air stream at a first pressure downstream thereof;

a second fan positioned downstream of the first fan, the second fan operable to receive a portion of the first air stream and generate a second air steam at a second pressure;

a fan bypass duct operative to direct a portion of the second air stream to a bypass stream around the engine core;

an other fan bypass duct operative to direct a portion of the first air stream to an other bypass stream around the engine core; and an adaptive heat exchange system operative to cool an object of cooling using the air from the fan bypass duct and/or the other fan bypass duct as a cooling medium;

wherein the gas turbine engine is configured to operate in a first mode in which the second pressure in the fan bypass duct is greater than the first pressure in the other fan bypass duct, and in a second mode in which the second pressure in the fan bypass duct is substantially the same as the first pressure in the other fan bypass duct; and wherein in the first mode the adaptive heat exchange system routes cooling medium from the fan bypass duct to the other fan bypass duct, and in the second mode the adaptive heat exchange system routes cooling medium from the other fan bypass duct to the other fan bypass duct.

2. The gas turbine engine of claim 1, wherein the adaptive heat exchange system includes a heat exchanger having a cooling medium inlet and a cooling medium outlet; wherein the cooling medium inlet is selectively exposed to a selected one or both of the fan bypass duct and the other fan bypass duct to receive a cooling medium; and wherein the cooling medium outlet is positioned to discharge the cooling medium into the other fan bypass duct.

3. The gas turbine engine of claim 2, wherein the heat exchanger is hinged to selectively expose the cooling medium inlet to the selected one or both of the fan bypass duct and the other fan bypass duct.

4. The gas turbine engine of claim 1, wherein the adaptive heat exchange system includes a heat exchanger operative to exchange heat in a parallel flow mode and a cross flow mode.

5. The gas turbine engine of claim 4, wherein the heat exchanger includes a fin operative to transfer heat from the object of cooling; wherein the parallel flow mode directs the cooling medium in a first direction parallel to the fin; and wherein the cross flow mode directs the cooling medium in a second direction not parallel to the fin.

6. The gas turbine engine of claim 5, wherein the heat exchanger includes a first cooling medium inlet for receiving the cooling medium in the parallel flow mode; and wherein the heat exchanger includes a second cooling medium inlet for receiving the cooling medium in the cross flow mode.

7. The gas turbine engine of claim 6, wherein the second cooling medium inlet includes an opening operative to impinge the cooling medium onto the fin.

8. The gas turbine engine of claim 1, wherein the adaptive heat exchange system is operative to cool the object of cooling using air by selecting the air from one or both of the fan bypass duct and the other fan bypass duct in response to an engine operating condition.

9. The gas turbine engine of claim 8, wherein the adaptive heat exchange system is passively controlled.

10. The gas turbine engine of claim 8, wherein the adaptive heat exchange system is actively controlled.

11. A gas turbine engine, comprising:

a first airway carrying a first air stream at a first pressure generated by a first fan;

a second airway carrying a second air stream at a second pressure generated by a second fan, wherein the first fan receives airflow from the second fan; and an adaptive heat exchange system operative to cool an object of cooling using air from the first airway and the second airway as a cooling medium;

wherein the adaptive heat exchange system includes a heat exchanger having a first cooling medium inlet and a second cooling medium inlet; wherein the first cooling medium inlet is adapted to receive the cooling medium from one of the first airway and the second airway; and wherein the second cooling medium inlet is adapted to receive the cooling medium from the other of the first airway and the second airway.

12. The gas turbine engine of claim 11, wherein the first airway is a first working fluid main flowpath; and wherein the second airway is a second working fluid main flowpath.

13. The gas turbine engine of claim 11, wherein the heat exchanger employs impingement cooling.

14. The gas turbine engine of claim 11, wherein the adaptive heat exchange system includes a valve operative to control flow through one of the first cooling medium inlet and the second cooling medium inlet.

15. The gas turbine engine of claim 14, wherein the adaptive heat exchange system includes a cooling medium exit; and wherein the valve is positioned in the cooling medium exit.

16. A gas turbine engine, comprising:

a compressor including a core passageway for routing core airflow therethrough, wherein the core airflow is pressurized by first and second fans prior to entering into the compressor;

a combustor in fluid communication with the compressor;

a turbine in fluid communication with the combustor;

a first bypass duct operative to direct air therethrough;

a second bypass duct disposed radially outward from the first bypass duct and operative to direct air therethrough;

an adaptive heat exchange system for cooling air from the compressor with air streams generated by the first and/or second fans prior to being discharged into the turbine;

wherein the adaptive heat exchange system is configured to adapt to first and second modes of operation, wherein in the first mode of operation the adaptive heat exchange system receives air as a cooling medium from the first fan bypass duct and expels the cooling medium into the second fan bypass duct, and in the second mode of operation the adaptive heat exchange system receives air as a cooling medium from the second fan bypass duct and expels the cooling medium into the second fan bypass duct.

17. The gas turbine engine of claim 16, wherein the air cooled by the adaptive heat exchange system is discharged into the turbine as cooling air.

18. The gas turbine engine of claim 16, wherein the adaptive heat exchange system is configured to receive a cooling medium from more than one cooling medium source, wherein in the first mode of operation the adaptive heat exchange system receives air from both the first fan bypass duct and the second fan bypass duct and expels the cooling medium into the second fan bypass duct.

19. The gas turbine engine of claim 18, wherein the adaptive heat exchange system is actively controlled to select a cooling medium source.

* * * * *